(12) United States Patent
Kryvobok

(10) Patent No.: US 10,345,436 B2
(45) Date of Patent: Jul. 9, 2019

(54) SYSTEM AND METHOD FOR DETECTING AN OBJECT OR RECESS ON A SURFACE

(71) Applicant: FLIR Systems, Inc., Wilsonville, OR (US)

(72) Inventor: Artem M. Kryvobok, Ghem (BE)

(73) Assignee: FLIR Systems, Inc., Wilsonville, OR (US)

( * ) Notice: Subject to any disclaimer, the term of this patent is extended or adjusted under 35 U.S.C. 154(b) by 510 days.

(21) Appl. No.: 15/132,133

(22) Filed: Apr. 18, 2016

(65) Prior Publication Data

US 2016/0231420 A1    Aug. 11, 2016

Related U.S. Application Data

(63) Continuation of application No. PCT/US2014/061641, filed on Oct. 21, 2014.

(60) Provisional application No. 61/894,361, filed on Oct. 22, 2013.

(51) Int. Cl.
| | |
|---|---|
| *G01C 3/08* | (2006.01) |
| *G01S 7/491* | (2006.01) |
| *G01S 17/32* | (2006.01) |
| *G01S 17/42* | (2006.01) |
| *G01S 7/481* | (2006.01) |

(52) U.S. Cl.
CPC .......... *G01S 7/4915* (2013.01); *G01S 7/4817* (2013.01); *G01S 17/325* (2013.01); *G01S 17/42* (2013.01)

(58) Field of Classification Search
CPC .... G01S 7/4915; G01S 7/4817; G01S 17/325; G01S 17/42
See application file for complete search history.

(56) References Cited

U.S. PATENT DOCUMENTS

| 4,567,347 A | 1/1986 | Ito et al. |
|---|---|---|
| 2007/0262896 A1 | 11/2007 | Turner et al. |
| 2009/0021721 A1 | 1/2009 | Gogolla et al. |

*Primary Examiner* — Samantha K Abraham
(74) *Attorney, Agent, or Firm* — Haynes and Boone, LLP

(57) ABSTRACT

Various techniques are disclosed for detection systems and methods to detect an object or a recess present on a surface. For example, a detection system includes a laser light source configure to emit a laser beam, a deflector configured to deflect the laser beam by a deflection angle, a modulator configured to modulate the laser beam with a modulation frequency, a control unit configured to control the deflector and the modulator to vary the deflection angle in conjunction with the modulation frequency as a function of time according to a scanning sequence, a memory configured to store the scanning sequence and reference modulation frequencies for corresponding reference times, an optical sensor configured to detect a reflected laser beam, and a signal processor to extract and compare measured modulation frequencies of the detected reflected laser beam with reference modulation frequencies to detect an object or a recess on a surface.

20 Claims, 3 Drawing Sheets

SYSTEM AND METHOD FOR DETECTING AN OBJECT OR RECESS ON A SURFACE

CROSS-REFERENCE TO RELATED APPLICATIONS

This application is a continuation of International Patent Application No. PCT/US2014/061641 filed Oct. 21, 2014 and entitled "SYSTEM AND METHOD FOR DETECTING AN OBJECT OR RECESS ON A SURFACE", which is incorporated herein by reference in its entirety.

International Patent Application No. PCT/US2014/061641 filed Oct. 21, 2014 claims the benefit of and priority to U.S. Provisional Patent Application No. 61/894,361 filed Oct. 22, 2013 and entitled "SYSTEM AND METHOD FOR DETECTING AN OBJECT OR RECESS ON A SURFACE", which is incorporated herein by reference in its entirety.

TECHNICAL FIELD

One or more embodiments of the disclosure generally relate to detection systems for detecting a change of shape, and more particularly, for example, to detection systems to detect a change of shape using a laser light source configured to emit a beam of laser light.

BACKGROUND

Range finding with laser light beams is often used to detect stationary objects in land survey applications, at a distance of about 1 meter up to 4 km. Because of the narrow spatial spreading of a laser beam on propagation, relatively small and distant objects can be selectively illuminated. The range finding process starts with observing the object with a telescope and pointing to it by overlaying the image with a reticle in the eyepiece of the telescope. The laser emitter is precisely aligned on the optical axis of the telescope, by a process known as "boresighting". This guarantees that the laser light will be incident on the place indicated by the centre of the reticle and that sufficient reflected laser light can be captured. The laser measurement is activated (normally by pushing a button) and subsequently the range is displayed. By scanning the laser over the surface of the target, under supervision of a signal processor, 2D and 3D maps of the object can be realized, provided that the resolution of the ranging method is substantially smaller than the size of the object. This scanning process is typically mechanical since the emitted laser beam and the optical axis of the telescope have to remain aligned at all times. A further drawback of such mechanical systems is a limited operational life time.

A recent general overview of range finding methods can be found in the article 'Optical methods for distance and displacement measurements', G. Berkovic, E. Shafir, Advances in Optics and Photonics 4, 441-471 (2012). Broadly speaking, three methods as described below in more detail are discussed in this article.

A first very common method for distance measurement is the "time of flight" method, where the distance is found by sending electromagnetic waves (e.g., light) to the object and measuring the time taken for the waves to travel from the sensor to the object and back. A laser pulse of a few nanoseconds duration is sent to a target, while simultaneously a fast digital counter is started. The scattered radiation returns to the sender and is there detected by a fast photo detector which stops the counter.

The disadvantage of this method is that a short, powerful laser pulse is needed, in order for the amplitude of the echo to be higher than the noise level. Ranges up to about 100 meter require peak powers of 10-50 Watts, whereas ranges up to 5 km ask for 10-1000 kilowatts. The pulse length is typically a few nanoseconds.

A second method is phase modulation, wherein the outgoing light is sinusoidal amplitude-modulated with a constant frequency, and the phase difference between the local wave and the received wave is measured. The phase difference can be obtained by measuring the time differences between the zero crossings of the emitted wave and the reflected wave. In both cases, the maximum distance that can be measured, while avoiding ambiguities, is determined by the selected modulation frequency. This maximum range is less than 50 meters for commercial models.

A third method is the FMCW or frequency modulation continuous wave method. This is a form of coherent detection. In the phase shift method, the phase difference between incident and reflected field is detected. In the FMWC method, the frequency difference is detected. The emitted beam of a wavelength tuneable diode laser is periodically and linearly chirped in frequency (saw tooth envelope). The received signal has the same frequency profile, but time-shifted by the roundtrip time. The emitted and reflected signals are mixed in a square-law photo detector, whose main AC component is the frequency difference of both signals. This frequency, together with the chirp duration and the range of the frequency sweep, determine the roundtrip time and hence the distance to the target.

Technologically, this is the most demanding method, since the wavelength of the laser must be configurable, which is far from obvious. This technique is used predominantly for metrological applications, where the form of a surface must be measured remotely and accurately in 3D. Examples are the body of an airplane or the hull of a ship. The disadvantages here are thus the cost and the complexity of the system.

Furthermore, all three methods as mentioned above are basically meant for point measurements by observing and aiming to a fixed point, with a telescope part of the range finder. Consequently, prior observation by an operator is necessary.

In U.S. Patent Application Publication No. 2008/0018881, a homodyne detection scheme for linear FM modulated lidar is presented in which pulse de-chirping is performed in the optical domain. This homodyne detection scheme comprises a laser, a modulator, a telescope, a balanced photo detector, processing circuitry and a waveform generator. In the method using this system, both the optical signal and the local oscillator are modulated by the same linear frequency chirp. The de-chirping process is accomplished within the photodiode. In order to measure the distance to an object, the beat frequency is measured and that beat frequency is calibrated in a distance.

The disadvantage of this system is that it is not possible to scan a surface therewith. Only single range point measurements can be performed.

Accordingly, there is a need to resolve the above-identified shortcomings of the existing systems. More particularly, there is a need to provide an improved detection system that can scan a surface in a simple, cost efficient and very fast way, and furthermore to provide such a detection system wherein no prior observation by an operator has to be done.

SUMMARY

Various techniques are disclosed herein to provide detection systems and related methods to detect changes to a shape resulting from changes to the form or position of a surface relative to the detection system or changes to a shape resulting from an object being present on a surface or a recess being present on a surface. The detection system can be stationary or mobile. It can for instance be mounted on a traffic pole to be used as a traffic sensor for detecting vehicles passing by or for detecting objects on or recesses appearing in a road surface or any changes in the form or position of this road surface. The detection system can also be mounted, for example, on a vehicle for autonomous vehicles guidance.

In accordance with various embodiments of the disclosure, a detection system to detect a change of shape may comprise a laser light source configured to emit a beam of laser light emitted with a first frequency. One or more modulators may be provided that are configured to add a second frequency to the first frequency of the emitted beam of laser light resulting in a modulated beam of laser light having a second overall frequency being the sum of the second frequency and the first frequency. One or more first control units of the one or more modulators may be provided that are arranged to control the second frequency. The system may further comprise an optical sensor configured to measure the second frequency of at least a portion of reflected laser light being the result of the reflection of the modulated beam of laser light by the shape and convert the portion of the reflected laser light into a digital signal. A signal processor may be provided that is configured to process the digital signal by extracting the second frequency out of the digital signal as a function of the measurement time.

In one embodiment, the detection system may further include: one or more deflectors configured to deflect the emitted beam of laser light or the modulated beam of laser light by a deflection angle into a deflected beam of laser light; one or more second control units of the one or more deflectors arranged to control the deflection angle of the deflected beam of laser light as a function of a deflection time, wherein the one or more first and the second control units together are arranged to perform one or more scanning sequences of the surface comprising a series of deflection angles that are linked to a series of overall second frequencies and a third series of deflection times, and wherein the signal processor is arranged to calculate a measurement sequence comprising a series of measurement times at which the second frequencies are observed; and a memory configured to store a reference measurement sequence comprising a series of reference times observed when the shape is in its reference state, wherein the signal processor is further configured to compare for a every second frequency of the scanning sequence the measurement time of the measurement sequence with the reference time of the reference measurement sequence and to detect a change of the shape when there is a difference between the measured time and the reference time at that certain reference time.

A detection system according to such an embodiment allows scanning of the shape between a maximum and a minimum distance. In this way, a change to this shape can be detected without prior observation by an operator. Furthermore, no continuous attendance by an operator is necessary.

In some embodiments of the detection system, the signal processor may be configured to detect a change to shape when for a certain second frequency of the scanning sequence the measurement time differs more than a predefined threshold of the frequency from the reference measurement time.

In some embodiments of the detection system, the reference measurement sequence further comprises a series of deflection angles of the deflected laser light.

In some embodiments, the detection system may comprise one or more collimator lenses which are placed in front of the detector and which are adapted to capture the reflected laser light over the complete field of view of the scanning sequence. This solves the boresighting problem of laser light.

In some embodiments, the optical sensor is a photo detector, the laser light source has a coherence length of at least the sum of the distance to the shape and back to the optical sensor, and the detection system comprises a first and a second beam splitter, wherein the beam splitter is configured to split the emitted beam of laser light into a local oscillator beam and an amplitude reduced emitted beam of laser light; the beam combiner is configured to superpose the local oscillator beam on the reflected laser light; and the photo detector is configured to subsequently mix the reflected laser light with the local oscillator beam to enable measurement of the second frequency. This is called "homodyning" or coherent detection. Because of this coherent detection, the detection system according to such embodiments is able to efficiently detect the second frequency of the reflected laser light.

In some embodiments, the detection system may comprise two deflectors that are arranged to deflect the emitted beam or the modulated beam of laser light in different planes.

In some embodiments of the detection system, one of the modulators and a corresponding one of the deflectors may be incorporated in the same acousto-optical deflector. Such an acousto-optical deflector thus takes care of two tasks, i.e., the scanning of a shape by means of the emitted beam of laser light and the allocation of a unique frequency to every direction angle of the scanning sequence of the emitted beam of laser light.

In some embodiments, the detection system may comprise an optical filter for filtering the central wavelengths of the reflected laser light.

In some embodiments, the memory may be provided as part of the signal processor.

In some embodiments of the detection system, the optical sensor is a PIN-photodiode, an Avalanche photodiode, a photomultiplier or a photon counter.

In some embodiments of the detection system, the laser light source is a laser emitting an emitted beam of laser light of approximately 1550 nm wavelength.

In accordance with various embodiments of another aspect of the disclosure, a method of detecting a change of shape according to various embodiments includes: emitting a beam of laser light with a first frequency by means of a laser light source; adding a second frequency to the first frequency of the emitted beam of laser light using one or more modulators, resulting in a modulated beam of laser light having a second overall frequency ($\omega_o$) being the sum of the second frequency ($\omega_i$) and the first frequency; controlling the overall second frequency as a function of a measurement time using one or more first control units of the one or more modulators; reflecting the modulated beam of laser light by the surface or an object present on the surface or a recess present in the surface resulting in reflected laser light; measuring the overall second frequency of at least a portion of the reflected laser light and converting the portion of the reflected laser light into a digital signal using an optical sensor; and processing the digital signal by extracting the second frequency out of the digital signal as a function of the measurement time using a signal processor.

In one embodiment, the method may further include: deflecting the emitted beam of laser light or the modulated beam of laser light by a deflection angle into a deflected beam of laser light using one or more deflectors; controlling the deflection angle of the deflected beam of laser light as a function of a deflection time using one or more second control units of the one or more deflectors, wherein the one or more first and second control units together are arranged to perform one or more scanning sequences (ss) of the surface comprising a series of deflection angles that are linked to a series of overall second frequencies and a third series of deflection times, wherein a measurement sequence is calculated by means of the signal processor, the measurement sequence comprising a series of measurement times at which the second frequencies are observed; and storing a reference measurement sequence comprising a series of reference times observed when the shape is in its reference state, wherein for a certain second frequency of the scanning sequence the measurement time of the measurement sequence is compared with the reference time of the reference measurement sequence using the signal processor, and wherein a change to the shape compared to its reference state is detected when there is a difference between this measured time of the reflected laser light and this reference time.

In various embodiments, the method may, for example, be performed using one or more embodiments of the detection system described above.

Various embodiments of the detection system and the method disclosed herein are suitable to detect changes to a shape, such as when detecting objects on the road surface or recesses in the road surface, such as for instance the hard shoulder of a highway. Examples of objects that may typically be present on hard shoulders of highways include stationary objects, such as tyres, lost luggage, or fallen objects, and moving objects, such as vehicles or animals.

In one example, therefore, the detection system and the related method disclosed herein may be beneficially utilized to monitor a hard shoulder lane of a highway in order to increase the highway's capacity. For instance when a traffic jam occurs on the highway, the hard shoulder lane can be opened for traffic. One of the requirements therefore is however to detect objects lying on the hard shoulder lane, or the presence of recesses in the pavement of the hard shoulder lane, so to timely warn upcoming vehicles. However, as for this purpose a high rate of detection confidence is expected, the video detection as commonly used for this purpose is not sufficient on its own to be able to achieve this requirement.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Figure 1:
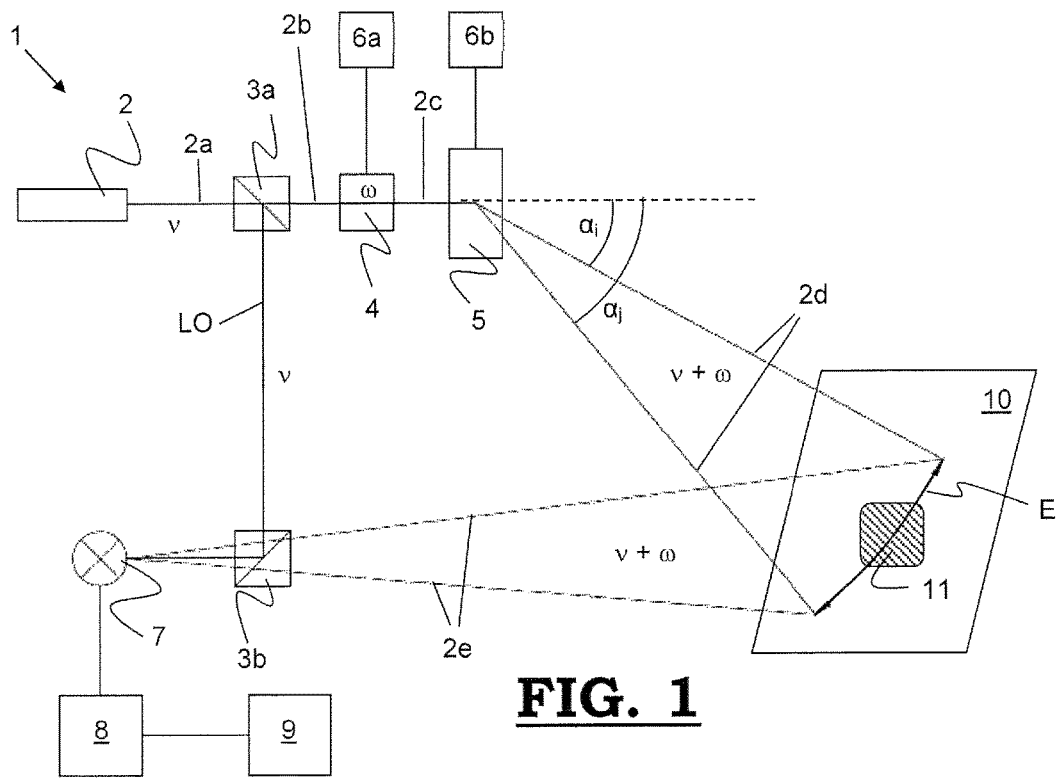
FIG. 1 illustrates a schematic view of the general principle of a homodyne detection scheme of a detection system in accordance with an embodiment of the disclosure.

In one or more embodiments, a detection system 1 to detect a change of a shape, such as for example a change in the form or position of a surveyed surface 10 relative to the detection system or an object 11 on or a recess in the surveyed surface 10 as shown in FIG. 1, generally comprises:
  a laser light source 2 is provided that is arranged to emit an emitted beam of laser light 2a having a first frequency (v);
  at least one modulator 4 that is configured to add a second frequency ($\omega_i$), preferably an acoustic frequency of 50-200 MHz, to the first frequency (v) of the emitted beam of laser light 2a resulting in a modulated beam of laser light 2c having a second overall frequency ($\omega_o$) being the sum of the second frequency ($\omega_i$) and the first frequency (v), or $\omega_o = v + \omega_i$;
  at least one deflector 5 that is configured to deflect the emitted beam of laser light 2a or the modulated beam of laser light 2c by a deflection angle ($\alpha_i$, $\alpha_j$) towards a shape such as the surveyed surface 10 of which the form or position relative to the detection system may have changed compared to a reference form and position,
  wherein the modulated and deflected laser light 2c, 2d that is reflected by the surface 10, the object(s) 10 or recess(es) is represented as reflected laser light 2e (also called 'echo') which also has the overall frequency ($\omega_o$);
  an optical sensor 7 configured to measure the second frequency ($\omega_i$) of at least a portion of the reflected laser light 2e and to convert the portion of the reflected laser light 2e into a digital signal;
  a signal processor 8 (e.g., a digital signal processor) configured to process the digital signal by extracting the second frequency ($\omega_i$) out of the digital signal as a function of a measurement time ($t_m$) (=a time at which the reflected laser light 2e returns and the second frequency ($\omega_i$) is measurable); and a memory 9.

In some embodiments, the laser light source 2 may preferably work at 1550 nm, which corresponds to an optical frequency (ν) of 200 THz and a bandwidth of about 100 KHz, resulting in a coherence length of at least two times the distance between laser source and surface we want scan, e.g., 300 m. The power of the laser light source 2 in such embodiments may preferably be 10 mW.

In some embodiments, the one or more modulators 4 can be located before the one or more deflectors 5, as shown in FIG. 1. The emitted beam of laser light 2a is then first frequency modulated, through which a modulated beam of laser light 2c is obtained, and consequently deflected, through which a deflected beam of laser light 2d is obtained. In other embodiments, however, the one or more modulators 4 can be located after the one or more deflectors 5. In such other embodiments, the emitted beam of laser light 2a is then first deflected, resulting in a deflected beam of laser light 2d, and consequently frequency modulated, resulting in a modulated beam of laser light 2c.

As can be seen on FIG. 1, the one or more modulators 4 are controlled by one or more first control units 6a that are arranged to control the second frequency ($\omega_i$) as a function of a deflection time ($t_d$). Also the one or more deflectors 5 are controlled by one or more second control units 6b that are arranged to control the deflection angle ($\alpha_i$, $\alpha_j$) of the deflected laser light 2d as a function of the deflection time ($t_d$). These first and second control unit(s) 6a, 6b together are arranged to perform one or more scanning sequences (ss) of the surveyed surface 10 comprising a series of deflection angles ($\alpha_i$, $\alpha_j$) that are linked to a series of second frequencies ($\omega_i$) and a third series of deflection times ($t_d$).

The memory 9 is configured to store a reference measurement sequence (ms) comprising at least a series of reference times ($t_r$) observed when a shape is in its reference state, this for example means that the surface 10 is in a reference form and position.

Although the memory 9 is shown in FIG. 1 as a discrete element, it will be appreciated that it may also be part of the signal processor 8.

In one embodiment, the reference measurement sequence (ms) is preferably in the form of a look-up table (see table 1 below) that is stored in the memory 9 having three columns, i.e. a first column about a scanning sequence (ss) having a series of deflection angles ($\alpha$), a series of second frequencies ($\omega_i$) and a series of deflection time ($t_d$), a second column with a series of measurement times ($t_m$) and a third column with a series of reference times ($t_r$). Although the reference measurement sequence (ms) stored in the memory 9 is shown as a look-up table, it should be appreciated that the reference measurement sequence (ms) may be stored as a linked list, tree, hash, or any other appropriate data structure to look up a reference time corresponding to a scanning sequence (ss). Further, although the scanning sequence is shown in table 1 as an example to include a series of discrete values for deflection angle ($\alpha$), second frequency ($\omega_i$), and deflection time ($t_d$), it is contemplated that in other embodiments the deflection angles ($\alpha$), second frequencies ($\omega_i$), and/or deflection times ($t_d$) may be provided as ranges or formulas from which a desired sequence can be derived (e.g., by interpolation or extrapolation), in addition to or in place of a series of discrete values. It should therefore be appreciated that the series of deflection angles ($\alpha$), second frequencies ($\omega_i$), and/or deflection time ($t_d$) in the scanning sequence may be understood to comprise such ranges or formulas for some embodiments.

TABLE 1

| Scanning sequence | | | Measurement sequence | Reference sequence |
|---|---|---|---|---|
| Deflection angle (α) | Modulation frequency (ω) | Deflection time | Measured time | Reference time |
| $\alpha_1$ | $\omega_1$ | $t_1^D$ | $t_1^M$ | $t_1^R$ |
| ... | ... | ... | ... | ... |
| $\alpha_N$ | $\omega_N$ | $t_N^D$ | $t_N^M$ | $t_N^R$ |

In order to detect a change to the shape compared to its reference state, such as for example change of the form or position of the surface 10 compared to the reference form and position of the surface, the signal processor 8 is further configured to compare at a certain reference time ($t_r$) the measurement time ($t_m$) of the measurement sequence (ms) with the reference time ($t_r$) of the reference measurement sequence (rms). When there is a difference between the measured time ($t_m$) and the reference time ($t_r$) at that certain reference time ($t_r$), a change of the form or position of the surface 10 compared to the reference form and position of the surface is detected.

The continuous tuning of the second frequency ($\omega_i$) of the emitted beam of laser light 2a can be done in a number of technological ways known to a person skilled in the art. In each way, the signal processor 8 knows which second frequency ($\omega_i$) is allocated to which point of the different points where the emitted beam of laser light 2a reflects on the surface 10 thus forming a scanning line (E) during a scanning sequence (see FIG. 1).

Figure 3A:
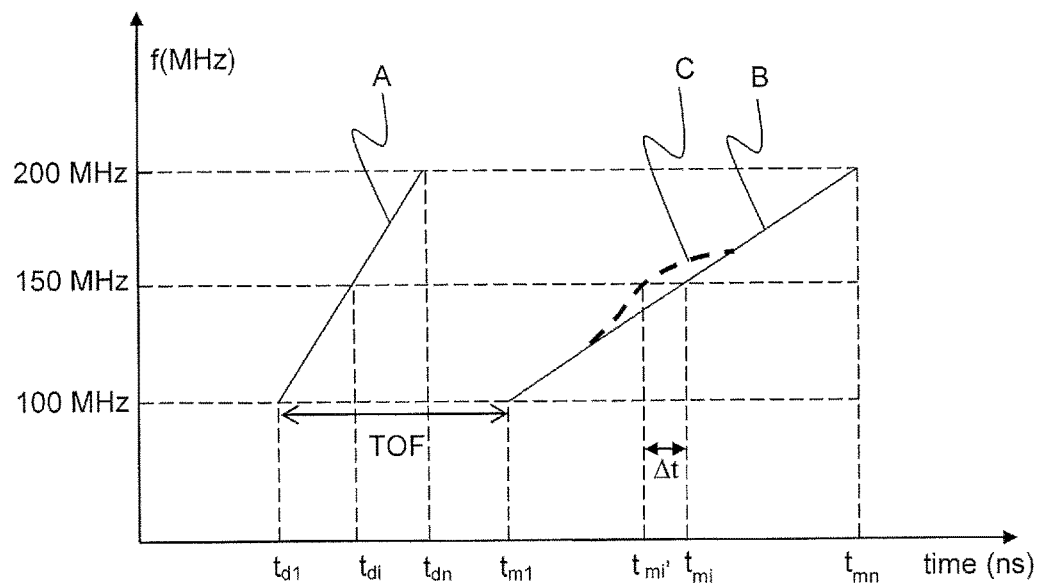
FIG. 3a illustrates a chart representing the course of the emitted beam of laser light and the reflected laser light at certain frequencies of the emitted beam of laser light in function of the times these emitted beams of laser light are emitted and the reflected laser light is reflected, where an object is present on the surface to be scanned as shown in FIG. 2, in accordance with an embodiment of the disclosure.
Figure 3B:
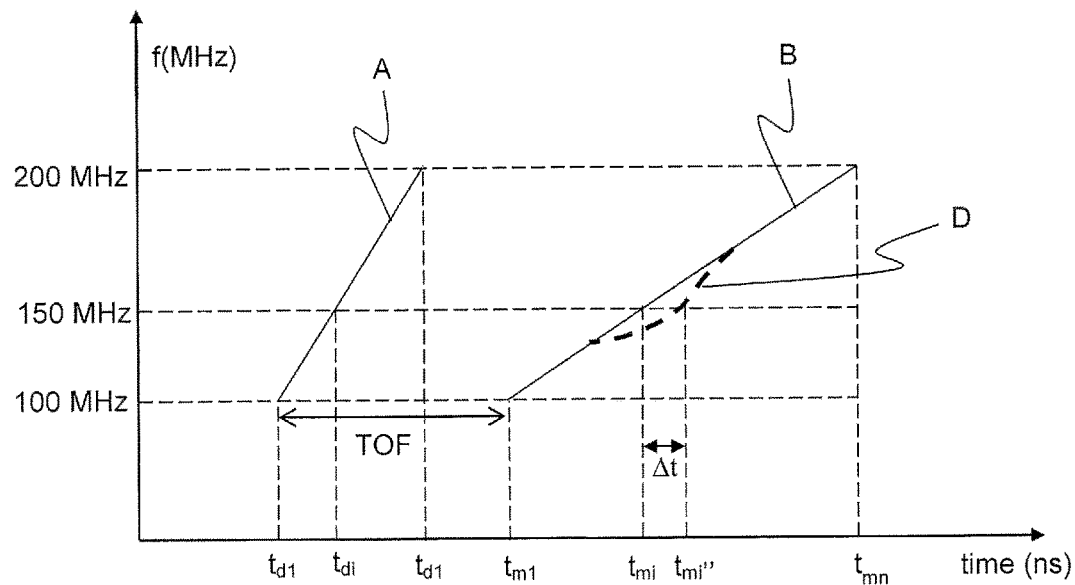
FIG. 3b illustrates a chart representing the course of the emitted beam of laser light and the reflected laser light at certain frequencies of the emitted beam of laser light in function of the times these emitted beams of laser light are emitted and the reflected laser light is reflected, where a recess is present in the surface to be scanned, in accordance with an embodiment of the disclosure.

Whether there is a change to the shape compared to its reference state, for example a change of the form or position of the surface 10 compared to the reference form and position of the surface 10 or an object 11 being present on the surface 10 which was not present before, is derivable from the course of the reflected laser light 2e), examples of which are illustrated in FIGS. 3a and 3b as further discussed below.

In FIGS. 3a and 3b, a diagram is presented firstly showing the course of the emitted beam of laser light 2a with a second frequency ($\omega_i$) at 100, 150 and 200 MHz, emitted at respective times $t_{d1}$, $t_{di}$ and $t_{dn}$, represented by line A. Furthermore, the course of the reflected beam of laser light 2e reflected on a surface in a reference form and position relative to the detection system and measured at respective times $t_{m1}$, $t_{mi}$ and $t_{mn}$ by the optical sensor represented by line B.

As can be seen in FIGS. 3a and 3b, if the scan of the emitted beam of laser light 2a started by the illuminating distance $d_1$ with frequency $f_1$, then after a delay of $2 \times d_1/c$, the reflected light with frequency $f_1$ is returning to the optical sensor 8. In this way, every frequency $f_n$ (with a corresponding distance $d_n$) of the emitted beam of laser light 2a is expected back after a delay of $2 \times d_n/c$. The signal processor 8 knows the time order of the second frequencies ($\omega_i$) of the emitted beam of laser light 2a during one scanning sequence (ss), or in other words the moment the emitted beam of laser light 2a normally is reflected, taking into account the time of flight (TOF), in case of the reference position and form of the surveyed surface 10. This time order is kept in the memory 9 as a reference. In some embodiments of a method of using the detection system 1, one or more training scans may be performed on the surveyed surface 10 when it is in its reference state to determine the time the emitted beam of laser light 2a is expected to be reflected back from the surface 10 in the reference state.

If a certain frequency ($f_n$) of the reflected beam of laser light 2c returns earlier or later than expected, represented with curve C in FIG. 3a, this means that there is a change of the form or position of the surface 10 compared to the reference form and position of the surface in the line-of-sight of the emitted beam of laser light 2a. When the form nor position of the surface 10 has changed, the emitted beam of laser light 2a having a second frequency ($\omega_i$) of 100 MHz is reflected at time $t_{m1}$, having a second frequency ($\omega_i$) of 150 MHz is reflected at time $t_{mi}$ and having a second frequency ($\omega_i$) of 100 MHz is reflected at time $t_{mi}$. For instance, instead of the reflected laser light 2e being reflected at time $t_{mi}$, it is reflected at time $t_{mi}'$. It is clear that in this way also objects on or recesses in the surveyed surface 10 can be detected. In general this thus allows a detection of a change of a shape compared to its reference state.

In one or more embodiments, a method of detecting a change of a shape, such as for example a change of the form or the position of a surface 10 relative to the detection system, generally comprises:

emitting a beam of laser light 2a with a first frequency (v) by means of a laser light source 2;

adding a second frequency ($\omega$) to the first frequency (v) of the emitted beam of laser light 2a using one or more modulators 4, resulting in a modulated beam of laser light 2c;

controlling the second frequency ($\omega$) as a function of time (t) using one or more first control units 6a of the one or more modulators 4;

deflecting the emitted beam of laser light 2a or the modulated beam of laser light 2c by a deflection angle ($\alpha$) into a deflected beam of laser light 2d using one or more deflectors 5;

performing one or more scanning sequences (ss) of the surface 10 by controlling the deflection angle ($\alpha$) of the deflected beam of laser light 2d as a function of time (t) using one or more second control units 6b of the one or more deflectors 5, wherein the one or more first and second control units 6a, 6b together are arranged to control that each deflection angle ($\alpha$) is a function of the second frequency ($\omega$);

storing a reference comprising a series of reference frequencies ($\omega_r$) being measured or estimated at certain reference times ($t_r$) during the scanning sequence (ss) of the shape in its reference state, for example the surface 10 which is in a reference form and position relative to the detection system, the reference frequencies ($\omega_r$) being linked to reference deflection angles ($\alpha_r$);

reflecting the modulated beam of laser light 2c by the surface 10 or an object 11 present on the surface 10 or a recess present in the surface 10 resulting in reflected laser light 2e;

measuring the second frequency ($\omega$) of at least a portion of the reflected laser light (2e) and converting the portion of the reflected laser light (2e) into a digital signal using an optical sensor 7; and processing the digital signal by extracting the second frequency ($\omega$) out of the digital signal as a function of time (t) using a signal processor 8, wherein at a certain time ($t_x$) during the scanning sequence (ss) the measured frequency ($\omega_m$) is compared with the reference frequency ($\omega_r$) of the reflected laser light 2e using the signal processor 8, and wherein an object on the surface 10 or a recess in the surface 10 is detected when there is a difference between the measured frequency ($\omega_m$) and the reference frequency ($\omega_r$) at that certain time ($t_x$).

The addition of a second frequency ($\omega_i$) to the first frequency (v) of the emitted beam of laser light 2a is ideally suited for detection by a homodyne detection system 1, for example. In a homodyne detection system 1 according to one or more embodiments, the laser light source 2 has a coherence length of at least the sum of the distance to the surveyed surface 10. This allows capturing of a potentially very weak signal from the reflected light and still extracting the second frequency ($\omega$). The main advantage of this method is that, although the laser beam is scanned, it is still possible to extract the second frequency ($\omega$) from the reflected light without the need for a complex dynamic optical alignment system.

Figure 5:
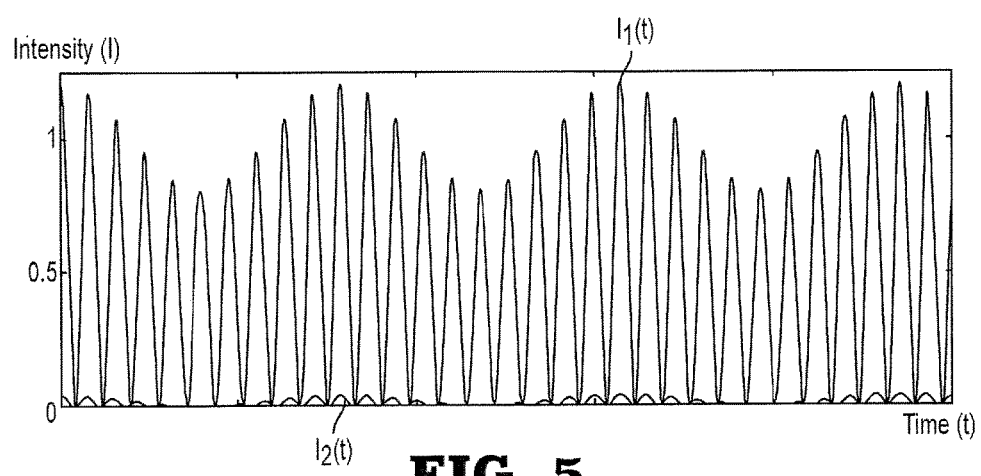
FIG. 5 illustrates a graph presenting the difference between the beating amplitude of the homodyne signal and the amplitude of the original frequency.

In FIG. 5, a graph is shown demonstrating the difference between the intensity $I_1(t)$ of the beating amplitude of the homodyne signal, this intensity $I_1(t)$ determined by the formula:

$$I1(t) := \left(\cos(10t) + \frac{1}{10}\cos(12t)\right)^2$$

and the intensity $I_2(t)$ of the amplitude of the reflected laser light 2e without being homodyned, this intensity $I_2(t)$ determined by the formula:

$$I2(t) := \left(\frac{1}{10}\cos(10t) + \frac{1}{10}\cos(12t)\right)^2.$$

Out of this graph, it can be seen that, with the same reflected power ratio of 1/10, the beat signal is much stronger for the homodyne detection.

It is remarked that, in order to achieve a local oscillator beam (LO), a coherent laser light source 2 is needed. The temporal coherence must be long enough in order to obtain the necessary beating of the reflected laser light 2e.

Figure 4:
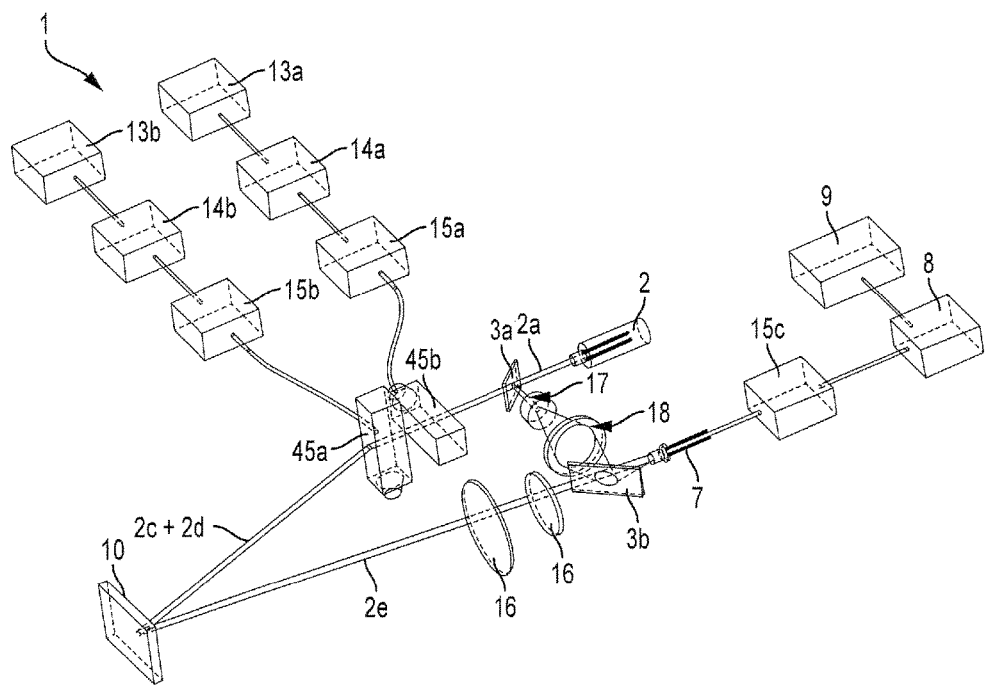
FIG. 4 illustrates a schematic 3D-view of a homodyning detection system in accordance with an embodiment of the disclosure.

In FIG. 4, various components of a homodyne detection system 1 are shown according one or more embodiments. For example, in addition to the various components discussed and shown above with reference to FIG. 1, the homodyne detection system 1 according to one embodiment may include:

a beam splitter 3a configured to split the emitted beam of laser light 2a into a local oscillator beam (LO) and an amplitude reduced emitted beam of laser light 2b;

one or more acousto-optic deflectors (AODs) 45a, 45b each being a combination of frequency modulator 4 for modulating the first frequency (v) of the emitted beam of laser light 2a into an overall second frequency ($\omega_o$) by adding a second frequency ($\omega_i$), and a deflector 5 for deflecting the angle ($\alpha_i$, $\alpha_j$, $\alpha_k$) of the emitted beam of laser light 2a;

a beam combiner (coupler) 3b for superposing the local oscillator beam (LO) on the reflected laser light 2e;

a photo detector (7) as the optical sensor; and one or more, preferably two, positive collimator lenses 16 located before the photo detector 7 in order to solve the bore sighting problem of the reflected laser light 2e.

In some embodiments, the AOD 45a/45b deflects a laser light beam over a few milliradian. This deflection is the result of the diffraction of the laser wave on the refractive index grating inside the modulator. The modulator is constructed in such a way that the grating diffracts only the +1 order (Bragg diffraction). Diffraction efficiency is 60%. So 40% remains in the zeroth order, and is not used by the range finder. The diffracted (deflected) beam of laser light $2d$ now carries an overall second frequency ($\omega_o$) which is the sum of the first (optical) frequency ($\nu$) of the laser light source 2 and the second (acoustic) frequency ($\omega_i$) of the modulator.

The second frequency ($\omega$) of each of the AOD's is determined by a respective voltage controlled oscillator (VCO) 14a, 14b. The second frequency ($\omega_i$) is ramped up by this VCO 14a, 14b from about 100 to 200 MHz, resulting in a saw tooth-signal produced by the signal (or function) generator 13a, 13b. As a result, the deflected beam of laser light $2d$ is swept periodically between the different deflection angles ($\alpha_i, \alpha_j, \alpha_k$) corresponding to a range between 100 and 200 MHz. Every deflection angle ($\alpha_i, \alpha_k, \alpha_k$) along the scanning sequence (ss) is thus linked to a different and unique second frequency ($\omega_i$) and the overall second frequency ($\omega_o$) of the emitted beam of laser light $2a$.

Each of the second frequencies ($\omega_i$) which are in the form of a saw tooth-signal may be amplified by means of a respective amplifier 15a, 15b, in accordance with some embodiments.

To raster scan the two-dimensional field-of-view, two acousto-optical deflectors (AOD's) 45a, 45b may need to be placed the one after the other, i.e. a first one to deflect in the X-direction and a second one to deflect in the Y-direction.

In some embodiments, the local oscillator beam (LO) may also be adapted using a positive lens 17 and a negative lens 18, such that the wavefronts of the local oscillator beam (LO) may be shaped at every scanning angle ($\alpha_i, \alpha_j, \alpha_k$) to have the same or substantially same amplitude. An optical arrangement 17, 18 in this way enables superposing LO wavefronts with the received beam at all scanning angles. Therefore, in some embodiments, the optical arrangement of lenses is set in such a way that the focused LO beam shape is exactly or substantially aligned with the scanning angular span, which means that the scanning beam will always be at the same or substantially same interference angle with the LO.

The beam splitter 3a halves the amplitude of the emitted beam of laser light $2a$. The first frequency ($\nu$) however remains the same.

The beam combiner 3b mixes the weak reflected laser light $2e$ with the strong signal of the local oscillator beam (LO) on the surface of a preferably fast photo detector 7. This fast photo detector 7 is a square law detector, which measures the beating frequency between the local oscillator beam (LO) and the reflected laser light $2e$. This beating frequency is amplified and is send to a digital signal processor 8 for further treatment.

In various embodiments, the beam splitter/combiner (3a, 3b) may be implemented using Mach-Zehnder interferometers. A Mach-Zehnder interferometer is a device that is used to determine the relative phase shift variations between two collimated beams derived by splitting light from a single source.

In various embodiments, a PIN-photodiode, Avalanche photodiode, or other suitable types of photomultiplier or photon counter may be used to implement a photo detector 7. As shown for one example in FIG. 4, an amplifier 15c may be provided, for example between the photo detector 7 and the (digital) signal processor (DSP), in order to amplify the signal from the photo detector 7.

Figure 2:
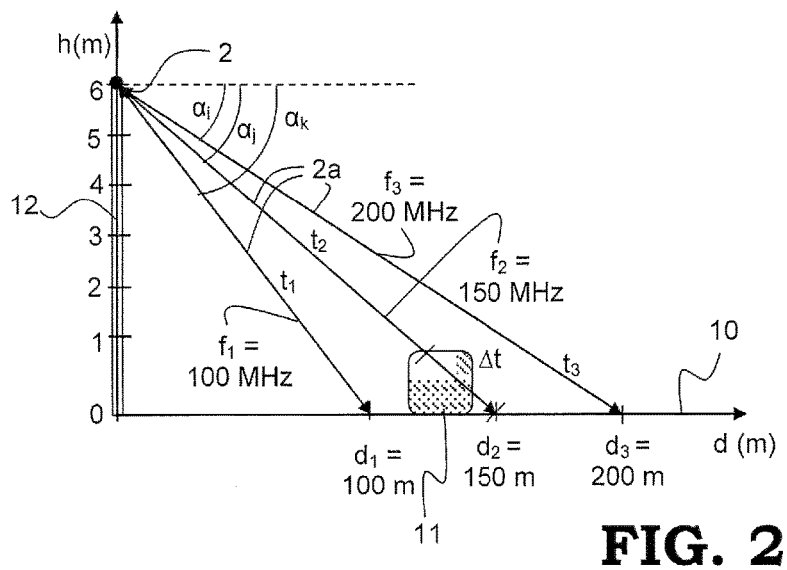
FIG. 2 illustrates a chart representing a detection system comprising a laser source mounted on a certain height (expressed in m) a pole, the laser source emitting a beam of laser light that are deflected under different deflection angles in order to scan a surface having an object present thereon at different distances between the laser source and the surface, in accordance with an embodiment of the disclosure.

Turning now to FIG. 2, FIG. 2 is an example illustration of a homodyne detection system 1 scanning a road surface 10, for instance the hard shoulder lane of a highway, for presence of objects 11 or recesses (not shown on the figures), in accordance with an embodiment of the disclosure. Although FIG. 2 shows the road surface 10 as being flat, this is not a pre-requisite. The road surface 10 can also be bumpy.

In the example detection system 1 shown in FIG. 2, a laser light source 2 is installed on a pole 12 at a predetermined height (Y-axis of the chart), here being about 6 meter. As discussed above, one or more AODs 45a, 45b may be driven periodically by a saw-tooth signal, starting for example at time $t_1$ at a scanning frequency of 100 MHz and stopping at a time $t_3$ at 200 MHz, where each distance $d_1, d_2, d_3$, for instance 100 m, 150 m and 200 m, on the hard shoulder corresponds to a certain second frequency (co), for instance 100, 150 and 200 MHz, respectively.

For purposes of illustration, consider an instantaneous moment during the scanning sequence (ss), for instance when the scanning frequency is at 150 MHz. At this moment, the deflected and modulated beam of laser light $2c$, $2d$ may have a frequency of 200 THz+150 MHz under a deflection angle ($\alpha_j$) of about 10 milliradian to the undeviated zeroth-order deflected and modulated beam of laser light $2c, 2d$. At this moment in this example, the target for the scanning may be the bottom plane of the hard shoulder 10 at a distance $d_2$ of 150 m. If there is no change of the form or position of the surface 10, the deflected and modulated beam of laser light $2c, 2d$ should hit this bottom plane of the hard shoulder 10 after 150×3 ns and arrive at the photo detector 7 after 2×150×3 ns. Consequently, after 900 ns, the DSP should register the incoming beat frequency ($\omega$) of 150 MHz. If however a sizeable object 11 is present at the hard shoulder at a distance $d_2$ of 150 m as shown in FIG. 2, the line-of-sight to the object 11 will become slightly shorter than 150 m and the reflected laser light $2e$ will come in at a sooner time, with $\Delta t$ being the difference between the reference time for the reflected laser light $2e$ is expected to come back and the actual time the reflected laser light $2e$ comes back to be detected by the photo detector 7. The DSP may be configured to detect this time difference $\Delta t$, and in turn detect the presence of the object 11 on the hard shoulder 10.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A detection system for detecting an object or change of shape on a surface, comprising:
   a laser light source configured to emit a laser beam;
   one or more deflectors configured to deflect the laser beam by a deflection angle $\alpha$;
   one or more control units configured to control the one or more deflectors to scan the surface with the laser beam by varying the deflection angle $\alpha$ according to a series of angle values belonging to a scanning sequence, the scanning sequence further comprising a series of frequency values each associated with a respective one of the angle values, wherein a modulation frequency $\omega$ for the laser beam is varied according to the series of frequency values of the scanning sequence in conjunction with the varying of the deflection angle $\alpha$;
   an optical sensor configured to detect at least a portion of a reflected laser light and generate a signal responsive to the detected reflected laser light, the reflected laser light resulting from reflection of the laser beam by the surface or an object on the surface;
   a memory configured to store a series of reference times each associated with a respective one of the frequency values of the scanning sequence, wherein the reference times are indicative of times at which the reflected laser light is expected to be detected by the optical sensor for each of the frequency values of the scanning sequence when the surface is in a reference state; and
   a signal processor configured to:
      process the signal from the optical sensor to extract the modulation frequency $\omega$ of the reflected laser light,
      calculate a measured time $t_m$ that is indicative of a time at which the reflected laser light is detected by the optical sensor,
      compare the measured time $t_m$ with a reference time $t_r$ chosen from the series of reference times stored in the memory, the reference time $t_r$ being associated with one of the frequency values that matches the modulation frequency $\omega$ extracted from the reflected laser light, and
      detect an object or change of shape on the surface based on a difference between the measured time $t_m$ and the reference time $t_r$.

2. The detection system of claim 1, wherein:
   the laser beam is emitted by the laser light source with a first frequency $v$;
   the detection system further comprises one or more modulators configured to modulate the laser beam by adding the modulation frequency $\omega$ to the first frequency $v$; and
   the one or more control units are further configured to control the one or more modulators to modulate the laser beam with the modulation frequency $\omega$ that is varied according to the series of frequency values of the scanning sequence in conjunction with the varying of the deflection angle $\alpha$ to scan the surface.

3. The detection system of claim 1, wherein the signal processor is configured to detect an object or change of shape on the surface by determining whether for a certain frequency value of the scanning sequence the measured time $t_m$ differs from the reference time $t_r$ by more than a predefined threshold $\Delta t$ for the frequency value.

4. The detection system of claim 1, wherein the memory is further configured to store a series of reference deflection angles of the laser beam each associated with a corresponding one of the reference times.

5. The detection system of claim 1, further comprising one or more collimator lenses which are placed in front of the optical sensor and adapted to capture the reflected laser light over a complete field of view of the scanning sequence.

6. The detection system of claim 1, further comprising a beam splitter and a beam combiner, wherein:
   the optical sensor comprises a photo detector;
   the laser light source has a coherence length of at least the sum of a distance to the surface and back to the optical sensor;
   the beam splitter is configured to split the laser beam into a local oscillator (LO) beam and an amplitude reduced laser beam;
   the reflected laser light results from reflection of the amplitude reduced laser beam by the surface or the object on the surface;
   the beam combiner is configured to superpose the LO beam on the reflected laser light; and
   the photo detector is configured to subsequently mix the reflected laser light with the LO beam to facilitate measurement of the modulation frequency $\omega$.

7. The detection system of claim 1, wherein the one or more deflectors comprise two deflectors that are arranged to deflect the laser beam in different planes towards the surface.

8. The detection system of claim 1, wherein the one or more deflectors comprise:
   a first acousto-optical deflector configured to deflect the laser beam in an X-direction and modulate the laser beam; and
   a second acousto-optical deflector configured to deflect the laser beam in a Y-direction and modulate the laser beam.

9. The detection system of claim 1, further comprising an optical filter configured to filter central wavelengths of the reflected laser light.

10. The detection system of claim 1, wherein the memory forms a part of the signal processor, wherein the optical sensor is a PIN-photodiode, an Avalanche photodiode, a photomultiplier, or a photon counter, and wherein the laser light source is a laser configured to emit the laser beam having a wavelength of approximately 1550 nm.

11. The detection system of claim 1, wherein the reference times are determined from a corresponding series of distances to the surface in the reference state.

12. A method of detecting an object or change of shape on a surface, the method comprising:
   emitting a laser beam using a laser light source;
   deflecting the laser beam by a deflection angle $\alpha$ using one or more deflectors;
   modulating the laser beam with a modulation frequency $\omega$ using one or more modulators;
   varying, using the one or more deflectors, the deflection angle $\alpha$ of the laser beam according to a series of angle values belonging to a scanning sequence, the scanning sequence further comprising a series of frequency values each associated with a respective one of the angle values;
   varying, using the one or more modulators, the modulation frequency $\omega$ for the laser beam according to the series of frequency values of the scanning sequence in conjunction with the varying of the angle α;

receiving the laser beam reflected by the surface or an object on the surface;

detecting, using an optical sensor, at least a portion of the reflected laser light to generate a signal responsive to the detected reflected laser light;

processing the signal from the optical sensor to extract the modulation frequency ω of the reflected laser light;

calculating a measured time $t_m$ that is indicative of a time at which the reflected laser light is detected by the optical sensor;

comparing the measured time $t_m$ with a reference time $t_r$ chosen from a series of reference times stored in a memory, wherein the series of reference times are each associated with a respective one of the frequency values of the scanning sequence and are indicative of times at which the reflected laser light is expected to be detected by the optical sensor for each of the frequency values of the scanning sequence when the surface is in a reference state, and wherein the reference time $t_r$ is associated with one of the frequency values that matches the modulation frequency ω extracted from the reflected laser light; and detecting an object or change of shape on the surface based on a difference between the measured time $t_m$ and the reference time $t_r$.

13. The method of claim 12, wherein:

the emitting the laser beam comprises emitting the laser beam with a first frequency ν; and the modulating the laser beam comprises adding the modulation frequency ω to the first frequency ν.

14. The method of claim 12, wherein the detecting an object or change of shape on the surface comprises determining whether for a certain frequency value of the scanning sequence the measured time $t_m$ differs from the reference time $t_r$ by more than a predefined threshold Δt for the frequency value.

15. The method of claim 12, further comprising storing in the memory the series of reference times and a series of reference deflection angles of the laser beam each associated with a corresponding one of the reference times.

16. The method of claim 12, further comprising collimating the reflected laser light for the optical sensor over a complete field of view of the scanning sequence.

17. The method of claim 12, wherein the optical sensor comprises a photo detector, and wherein the laser light source has a coherence length of at least the sum of a distance to the surface and back to the optical sensor, the method further comprising:

splitting the laser beam into a local oscillator (LO) beam and an amplitude reduced laser beam using a beam splitter, wherein the splitting the laser beam is by reflecting the amplitude reduced laser beam;

superposing the LO beam on the reflected laser light using a beam combiner; and mixing the reflected laser light with the LO beam at the photo detector to facilitate measurement of the modulation frequency ω.

18. The method of claim 12, wherein:

the one or more deflectors comprise two deflectors that are arranged to deflect the laser beam in different planes towards the surface; and the deflecting the laser beam comprises deflecting the laser beam in two different planes using the two deflectors.

19. The method of claim 12, wherein:

the one or more modulators and the one or more deflectors are together implemented in corresponding one or more acousto-optical deflectors; and the deflecting and the modulating are both by using the one or more acousto-optical deflectors.

20. The method of claim 12, wherein the reference times are determined from a corresponding series of distances to the surface in the reference state.

* * * * *

UNITED STATES PATENT AND TRADEMARK OFFICE
CERTIFICATE OF CORRECTION

PATENT NO. : 10,345,436 B2
APPLICATION NO. : 15/132133
DATED : July 9, 2019
INVENTOR(S) : Artem M. Kryvobok It is certified that error appears in the above-identified patent and that said Letters Patent is hereby corrected as shown below:

In the Specification

In the Detailed Description:

In Column 11, Line 15, change "deflection angle ($\alpha_i$, $\alpha_k$, $\alpha_k$) along" to --deflection angle ($\alpha_i$, $\alpha_j$, $\alpha_k$) along--

In Column 12, Line 12, change "a certain second frequency (co), for" to --a certain second frequency ($\omega$), for--

Signed and Sealed this
Twenty-sixth Day of May, 2020

Andrei Iancu
*Director of the United States Patent and Trademark Office*